(12) United States Patent
Shimada et al.

(10) Patent No.: US 8,406,505 B2
(45) Date of Patent: Mar. 26, 2013

(54) IMAGE BRIGHTNESS REDUCTION FOR LEGGED MOBILE ROBOT

(75) Inventors: Takamichi Shimada, Wako (JP); Taro Yokoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 803 days.

(21) Appl. No.: 12/230,130

(22) Filed: Aug. 25, 2008

(65) Prior Publication Data

US 2009/0060318 A1 Mar. 5, 2009

(30) Foreign Application Priority Data

Aug. 30, 2007 (JP) ................................. 2007-224755
Aug. 30, 2007 (JP) ................................. 2007-224756

(51) Int. Cl.
*G06K 9/00* (2006.01)
*G06K 9/40* (2006.01)

(52) U.S. Cl. ........................ 382/153; 382/274

(58) Field of Classification Search ................... 382/153
See application file for complete search history.

(56) References Cited

U.S. PATENT DOCUMENTS

| | | | |
|---|---|---|---|
| 5,378,969 A | 1/1995 | Haikawa | |
| 6,317,652 B1 | 11/2001 | Osada | |
| 6,542,307 B2 * | 4/2003 | Gleckman et al. | ............. 359/638 |
| 7,199,767 B2 * | 4/2007 | Spero | ................................. 345/7 |
| 2004/0197014 A1 * | 10/2004 | Oohashi | ......................... 382/118 |
| 2005/0007552 A1 * | 1/2005 | Fergason et al. | ............... 351/210 |
| 2005/0052557 A1 * | 3/2005 | Kusaka et al. | ................. 348/308 |
| 2005/0168569 A1 * | 8/2005 | Igarashi et al. | .................. 348/62 |
| 2005/0264021 A1 * | 12/2005 | Suzuki et al. | .................. 296/97.4 |
| 2005/0275562 A1 * | 12/2005 | Watanabe | ..................... 340/933 |
| 2007/0008624 A1 * | 1/2007 | Hirayama | ..................... 359/630 |
| 2007/0069026 A1 * | 3/2007 | Aoyama | .................. 235/462.09 |
| 2007/0296950 A1 * | 12/2007 | Sakagami et al. | ........... 356/4.01 |

FOREIGN PATENT DOCUMENTS

| | | |
|---|---|---|
| JP | 2006129084 | 10/2004 |
| JP | 2006-129084 | 5/2006 |
| WO | WO 02/40224 A1 | 5/2002 |

OTHER PUBLICATIONS

Spaceballs. Dir. Mel Brooks. Perf. Mel Brooks, John Candy, Rick Moranis, Bill Pullman, and Daphne Zuniga. MGM, 1987. Film.*
European Office Action, 43961P EP/HGpv, dated Dec. 15, 2008.

* cited by examiner

*Primary Examiner* — David Zarka
(74) *Attorney, Agent, or Firm* — Squire Sanders (US) LLP

(57) ABSTRACT

In a legged mobile robot having an imaging device (such as CCD camera) for taking an image utilizing incident light from external world in which a human being to be imaged is present, brightness reduction operation is executed to reduce brightness of a high-brightness imaging region produced by high-brightness incident light, when the high-brightness imaging region is present in the image taken by the imaging device. With this, when the imaged high-brightness imaging region is present owing to high-brightness incident light from the sun or the like, the legged mobile robot can reduce the brightness to image a human being or other object with suitable brightness.

13 Claims, 14 Drawing Sheets

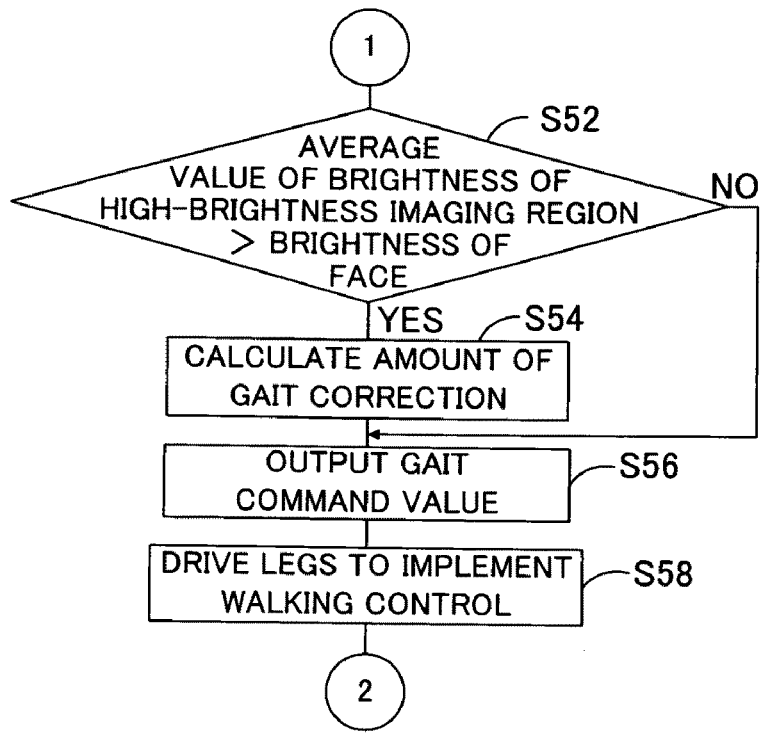
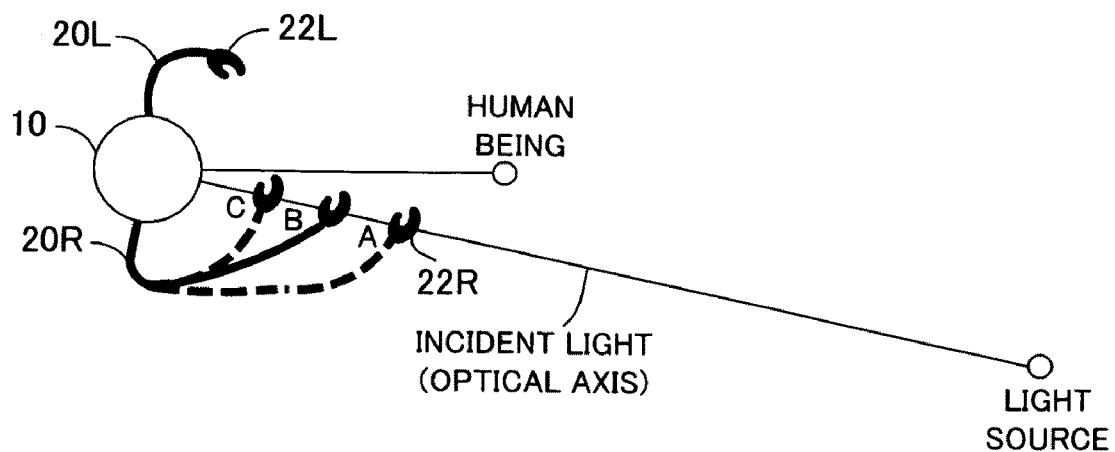

IMAGE BRIGHTNESS REDUCTION FOR LEGGED MOBILE ROBOT

BACKGROUND OF THE INVENTION

1. Field of the Invention

This invention relates to a legged mobile robot, particularly to a legged mobile robot equipped with a CCD camera (imaging device) that serves as a visual sensor capable of imaging objects with appropriate brightness even when the sun or other such bright light source falls within the image.

2. Description of the Related Art

As set out in Japanese Laid-Open Patent Application No. 2006-129084, for example, technologies have been developed for predicting the location, shape and the like of a ghost formed on the imaging plane of an imaging device by internal reflection when a bright light source like the sun falls within the angle of view of a camera, determining which portion of the taken image is the ghost, and correcting (reducing) the determined ghost portion in response to photographer instructions or automatically.

SUMMARY OF THE INVENTION

Although the technology of the reference is intended for application to a digital camera or video camera used to photograph a human being, a camera of this type is also sometimes used as a visual sensor mounted on a legged mobile robot or other mobile object.

In such a case, when a bright light source such as the sun or a spotlight is imaged by the imaging device, the brightness of a human being or other object to be imaged present at the portion affected by the light source is, as shown in FIG. 16, blotted out, making it impossible to identify the object. In FIG. 16, a human being actually present on the right side of the image cannot be discerned.

The object of this invention is to overcome this problem and provide a legged mobile robot that enables imaging of an object with suitable brightness even when a bright light source such as the sun is visible to the camera (imaging device) used.

In order to achieve the object, this invention provides a legged mobile robot having an imaging device for taking an image utilizing incident light from external world in which a human being to be imaged is present, comprising: brightness reduction operation execution means for determining whether a high-brightness imaging region is present in the image taken by the imaging device and for executing brightness reduction operation to reduce brightness of the high-brightness imaging region produced by high-brightness incident light, when the high-brightness imaging region is present in the image.

BRIEF DESCRIPTION OF THE DRAWINGS

The above and other objects and advantages of the invention will be more apparent from the following description and drawings in which:

FIG. 7 is the latter half of the flowchart of FIG. 6;

FIG. 8 is a diagram for explaining the operation by a hand for reducing the brightness in the processing shown in FIG. 6;

DETAILED DESCRIPTION OF THE PREFERRED EMBODIMENTS

Figure 1:
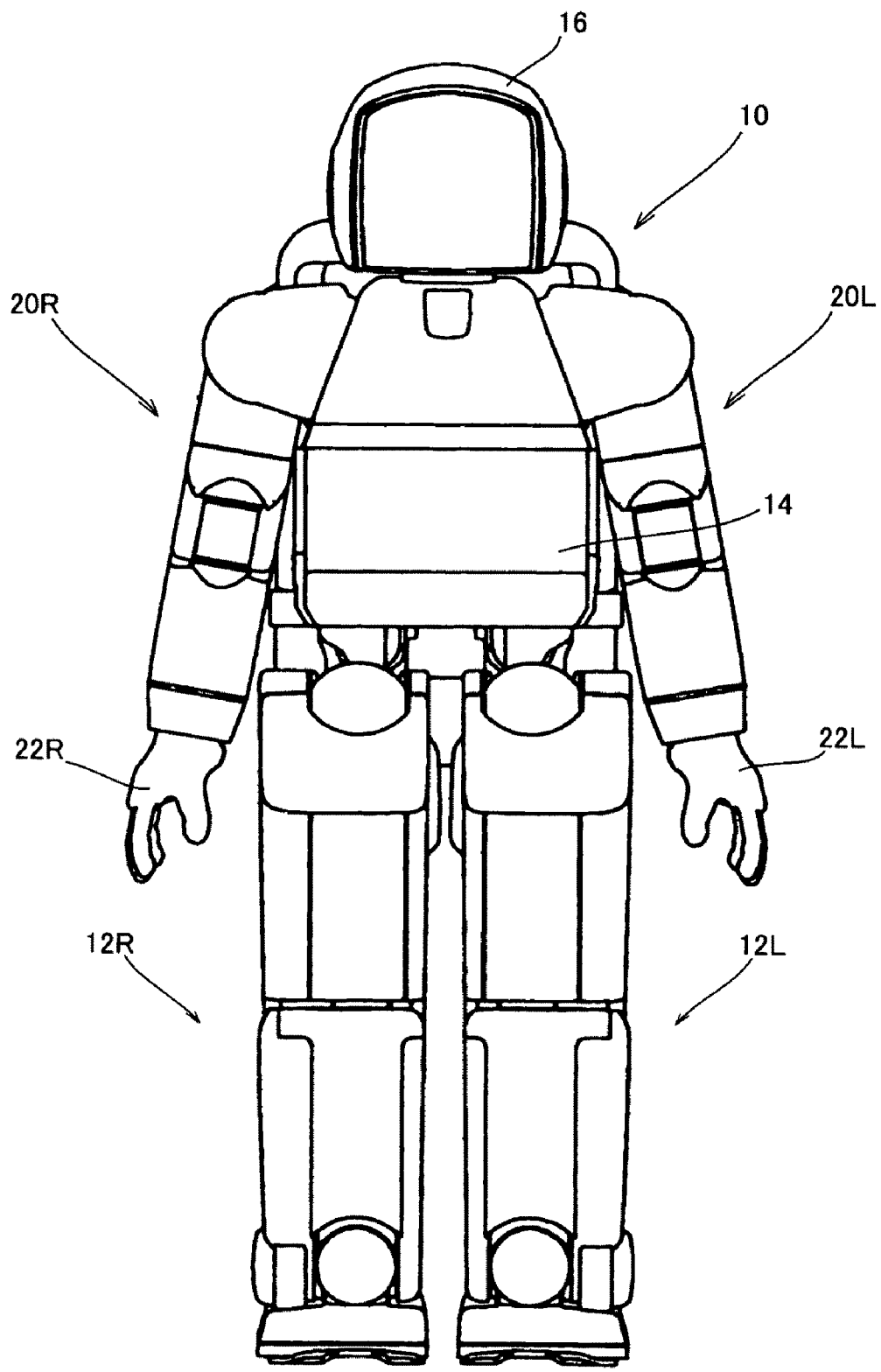
FIG. 1 is a front view of a legged mobile robot according to embodiments of the invention.
Figure 2:
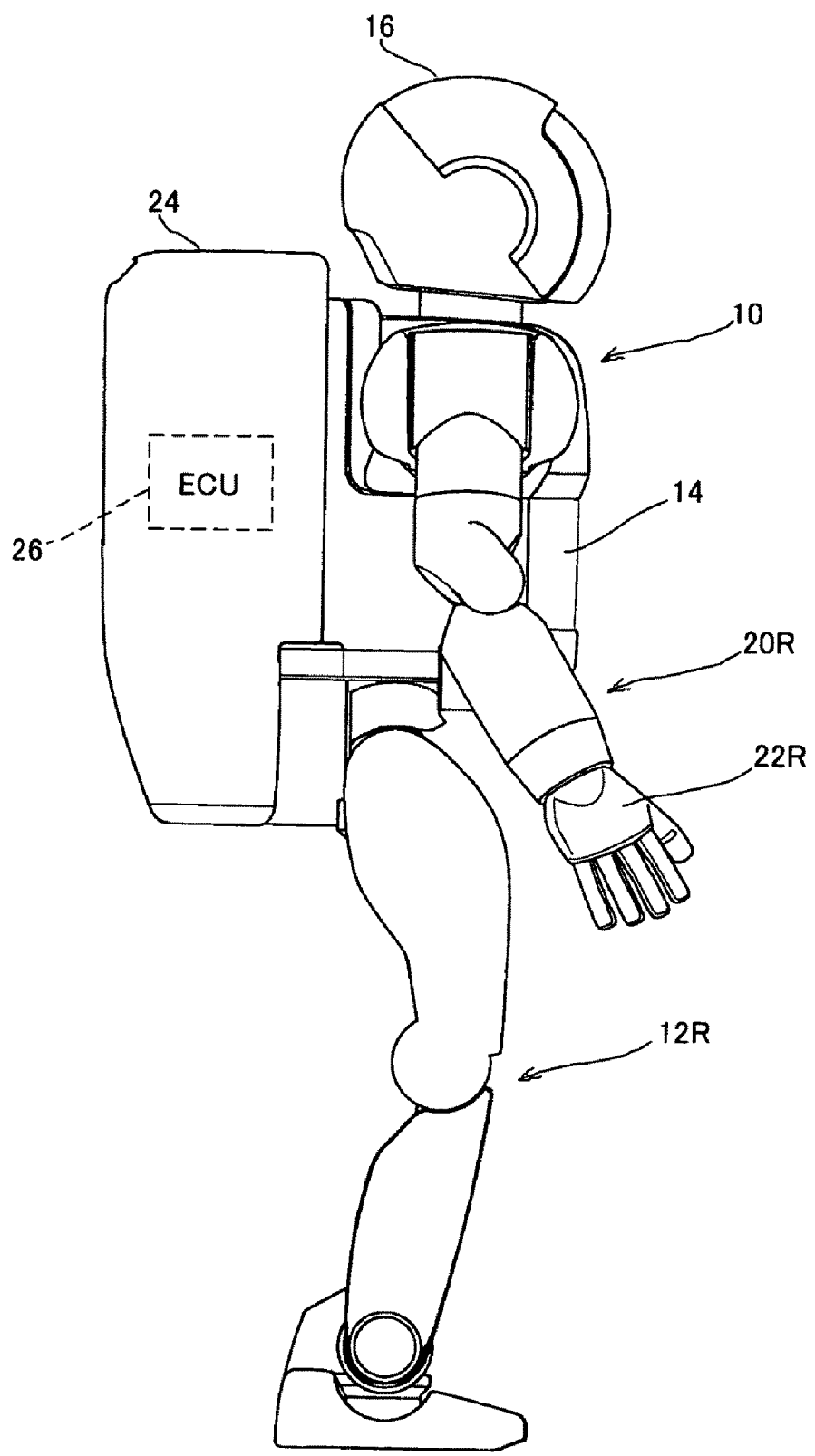
FIG. 2 is a side view of the robot shown in FIG. 1.

FIG. 1 is a front view of a legged mobile robot, i.e., a mobile object according to a first embodiment of this invention is mounted. FIG. 2 is a side view of the robot shown in FIG. 1.

As shown in FIG. 1, the legged mobile robot (mobile object), designated by the reference symbol 10 in the drawings and sometimes referred to simply as "robot" hereinafter, is equipped with left and right legs 12L, 12R. Here and hereinafter L and R are used to indicate left and right. The legs 12L, 12R are connected to the bottom of a body 14. A head 16 is connected to the top of the body 14 and left and right arms 20L, 20R are connected to opposite sides of the body 14. Hands (end effectors) 22L, 22R are connected to the distal ends of the left and right arms 20L, 20R. In this embodiment, the legged mobile robot is exemplified by a humanoid robot that has two legs and two arms and stands to a height of about 1.3 m.

As shown in FIG. 2, a storage unit 24 is mounted on the back of the body 14. The storage unit 24 houses, inter alia, an Electronic Control Unit (ECU) 26 and a battery (not shown).

Figure 3:
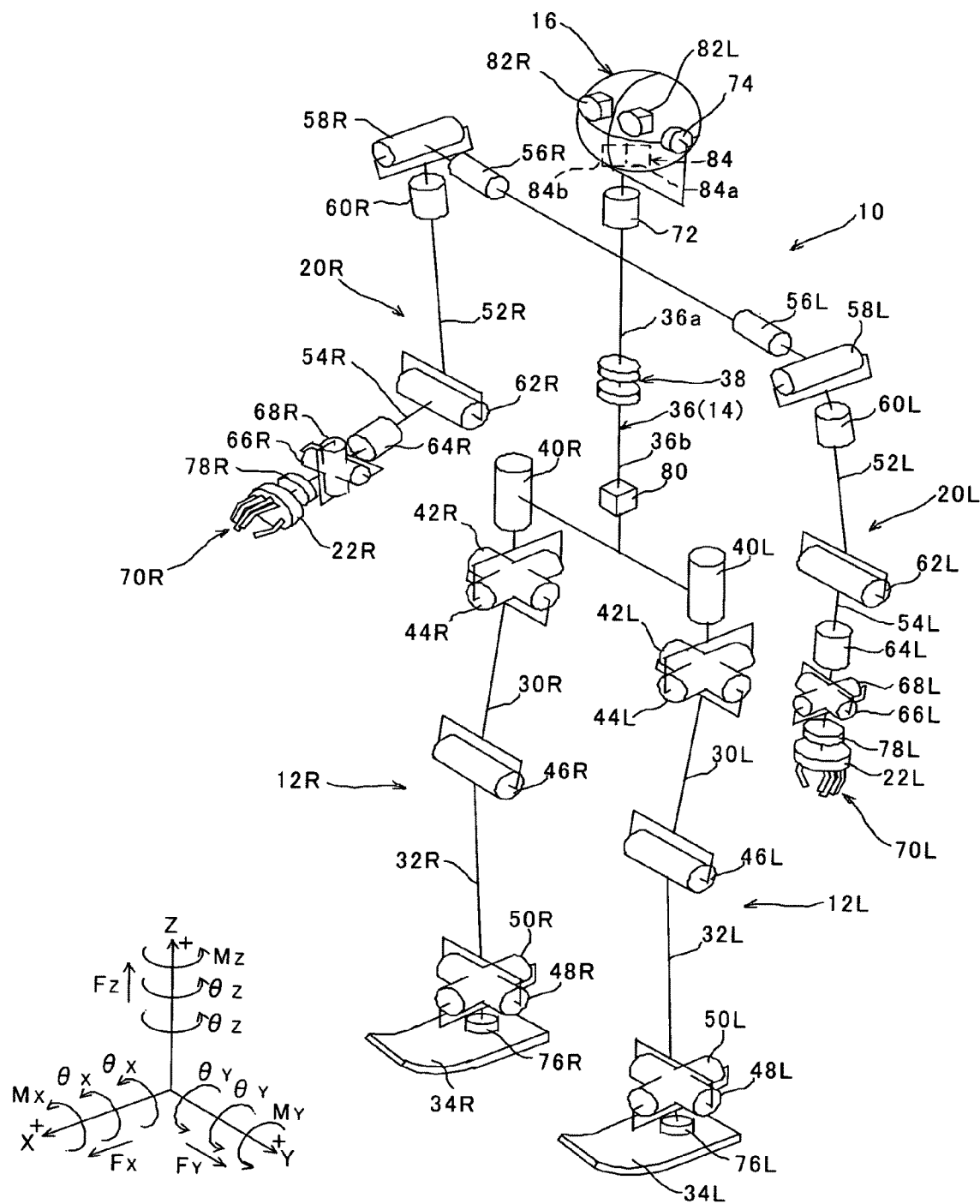
FIG. 3 is an explanatory diagram showing a skeletonized view of the robot shown in FIG. 1.

FIG. 3 is an explanatory diagram showing a skeletonized view of the robot 10 shown in FIG. 1. The internal structures of the robot 10 will be explained with reference to this drawing, with primary focus on the joints. Since the illustrated robot 10 is laterally symmetrical, affixation of L and R will be omitted in the explanation of FIG. 3.

The left and right legs 12 are each equipped with a thigh link 30, a shank link 32, and a foot member 34. The thigh link 30 is connected to the body 14 through a hip (crotch) joint. The body 14 is shown schematically in FIG. 3 as a body link 36. The body link 36 comprises an upper section 36a and a lower section 36b connected through a joint 38 to be movable relative to each other.

The thigh link 30 and shank link 32 are connected through a knee joint. The shank link 32 and the foot 34 are connected through an ankle joint. The hip joint comprises a rotary shaft 40 rotatable about a Z-axis (yaw axis), a rotary shaft 42 rotatable about a Y-axis (pitch axis), and rotary shaft 44 rotatable about an X-axis (roll axis). In other words, the hip joint has three degrees of freedom.

The knee joint comprises a rotary shaft 46 rotatable about the Y-axis and has one degree of freedom. The ankle joint comprises a rotary shaft 48 rotatable about the Y-axis and a rotary shaft 50 rotatable about the X-axis and has two degrees of freedom. Thus the left and right legs 12 are each imparted with 6 rotary shafts (degrees of freedom) constituting 3 joints, so that the legs as a whole are imparted with 12 rotary shafts (degrees of freedom).

The legs 12 are driven by actuators (not shown). The leg actuators that drive the legs 12 comprise 12 electric motors installed at appropriate locations on the body 14 and legs 12 to drive the 12 rotary shafts independently.

The left and right arms 20 are each equipped with an upper arm link 52 and a forearm link 54. The upper arm link 52 is connected to the body 14 through a shoulder joint. The upper arm link 52 and forearm link 54 are connected through an elbow joint, and the forearm link 54 and hand 22 are connected through a wrist joint.

The shoulder joint comprises a rotary shaft 56 rotatable about the Y-axis, a rotary shaft 58 rotatable about the X-axis, and a rotary shaft 60 rotatable about the Z-axis. It has three degrees of freedom. The elbow joint comprises a rotary shaft 62 rotatable about the Y-axis and has one degree of freedom. The wrist joint comprises a rotary shaft 64 rotatable about the Z-axis, a rotary shaft 66 rotatable about the Y-axis, and a rotary shaft 68 rotatable about the X-axis. It has three degrees of freedom. Thus the left and right arms 20 are each imparted with 7 rotary shafts (degrees of freedom) constituting 3 joints, so that the arms as a whole are imparted with 14 rotary shafts (degrees of freedom).

Like the legs 12, the arms 20 are also driven by actuators (not shown). The arm actuators that drive the arms 20 comprise 14 electric motors installed at appropriate locations on the body 14 and arms 20 to drive the 14 rotary shafts independently. The legs 12 and arms 20 of the robot 10 are imparted with desired movements by being controlled the operation of the leg actuators and arm actuators to drive the rotary shafts to suitable angles.

The hands 22 are each equipped with 5 fingers generally designated by the reference symbol 70. The fingers 70 are drivable by hand actuators (not shown) and can be operated in coordination with the arms 20 to grasp objects, point in a suitable direction and execute other such operations.

The head 16 is connected to the body 14 through a neck joint that comprises a rotary shaft 72 rotatable about the Z-axis and a rotary shaft 74 rotatable about the Y-axis. It has two degrees of freedom. The rotary shafts 72 and 74 are individually driven by head actuators (not shown). The head 16 can be faced in a desired direction by being controlled the operation of the head actuators to drive the rotary shafts 72 and 74 to suitable angles. The upper section 36a and lower section 36b can be rotated relative to each other by driving an actuator (not shown) installed at the joint 38.

A force sensor (six-axis force sensor) 76 attached to each of the left and right legs 12 produces outputs or signals representing the floor reaction force components Fx, Fy and Fz of three directions and the moment components Mx, My and Mz of three directions acting on the leg 12 from the floor. A similar force sensor 78 attached to each of the left and right arms 20 between the hand 22 and the wrist joint produces outputs or signals representing the external force components Fx, Fy and Fz of three directions and the moment components Mx, My and Mz of three directions acting on the arm 20.

An inclination sensor 80 installed on the body 14 produces outputs or signals representing state quantities of the body 14, including its inclination angle and angular velocity relative to the vertical axis. Two (left and right) imaging devices, specifically two CCD cameras (hereinafter sometimes called simply "cameras") 82 are installed in the head 16 for taking images utilizing incident light from the external world (ambience) in which a human being or other object to be imaged is present. A voice input/output device 84 comprising a microphone 84a and a speaker 84b is also installed in the head 16.

The outputs of the sensors and the like are sent to the ECU 26 (shown in FIG. 2). The ECU 26 is constituted as a microcomputer comprising a CPU, input/output circuits, ROM, RAM and other components, none of which are shown in the drawings.

Figure 4:
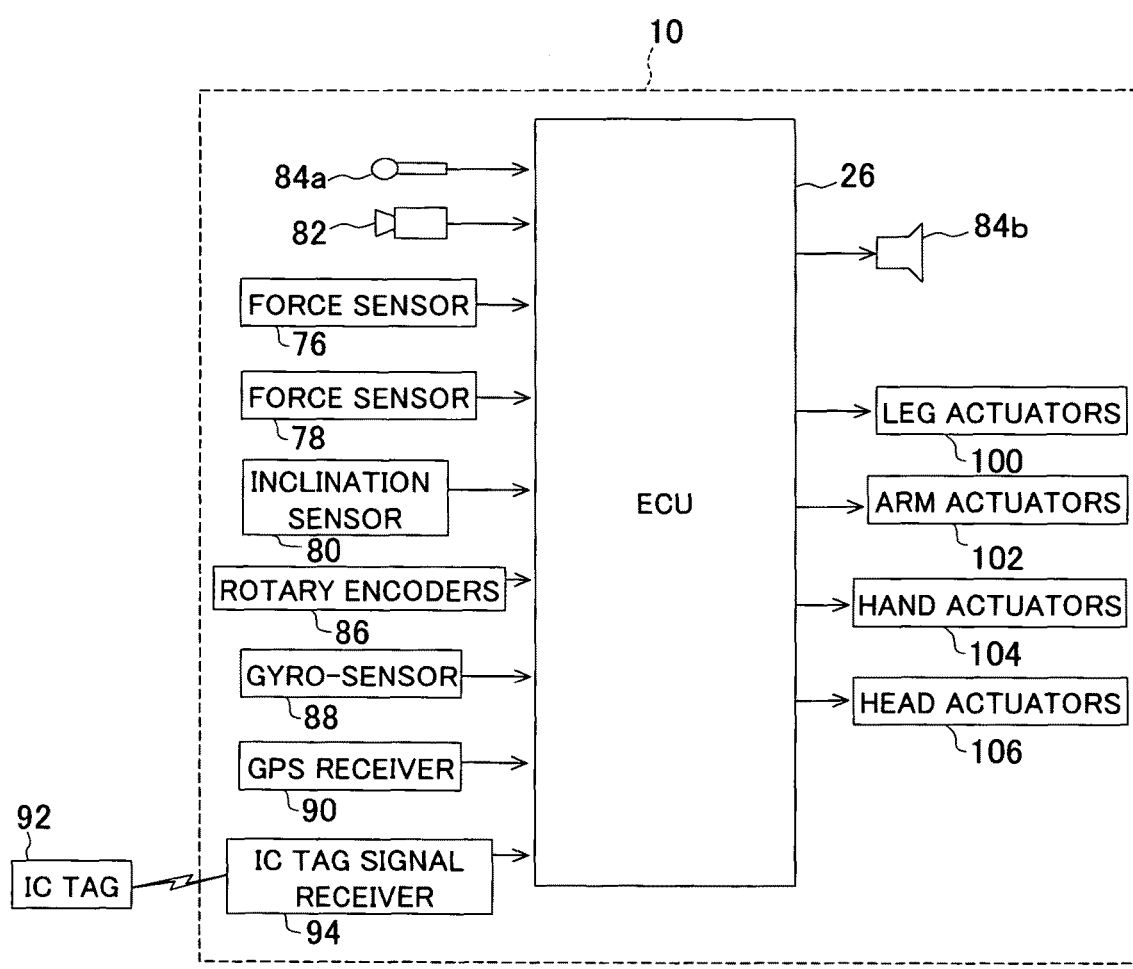
FIG. 4 is a block diagram showing the configuration of the robot shown in FIG. 1 primarily with regard to input/output of an electronic control unit (ECU)

FIG. 4 is a block diagram showing the configuration of the robot 10 primarily with regard to input/output of the ECU 26.

As illustrated, the robot 10 is equipped not only with the aforesaid sensors and the like but also with rotary encoders 86, a gyro-sensor 88, a Global Positioning System (GPS) receiver 90, and an IC tag signal receiver (reader) 94 wirelessly connected to an IC tag 92 carried (worn) by a human being (object of imaging) for receiving Integrated Circuit (IC) tag information transmitted by the IC tag 92.

The rotary encoders 86 produce outputs or signals indicative of the rotation angles, i.e. joint angles, of the respective rotary shafts 40 and the like. The gyro-sensor 88 produces an output or signal indicative of the direction and distance of movement of the robot 10. The GPS receiver 90 receives radio signals transmitted from satellites, acquires information on the position (latitude and longitude) of the robot 10, and sends the position information to the ECU 26. The IC tag signal receiver 94 wirelessly receives and sends to the ECU 26 identification information (RFID (Radio Frequency ID) information, specifically identification information identifying the human being who is the wearer of the IC tag 92)) stored in and transmitted from the IC tag 92.

The ECU 26 controls walking by generating a gait based on the outputs of the force sensors 76, inclination sensor 80, and rotary encoders 86. Specifically, it makes the robot 10 move (walk) by controlling the operation of leg actuators (designated 100) to drive the legs 12. The gait generation and walking control is performed in accordance with the teaching of Applicant's Japanese Patent No. 3726081 and will not be explained in detail here.

Concomitantly with the walking and other control, the ECU 26 further controls the operation of the arm actuators (designated 102) and the hand actuators (designated 104), thereby driving the arms 20 and hands 22, and controls the operation of the head actuators (designated 106), thereby regulating the orientation of the head 16.

In addition, the ECU 26 operates to conduct brightness reduction when high-brightness imaging region is imaged by the camera 82.

Figure 5:
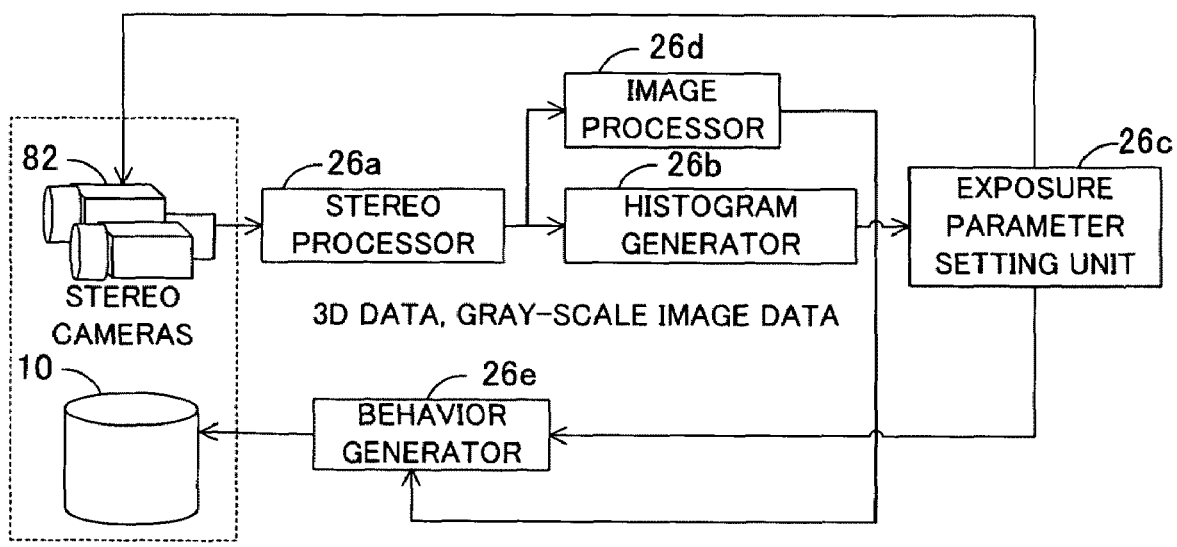
FIG. 5 is a block diagram functionally illustrating the configuration when the ECU shown in FIG. 4 conducts brightness reduction of high-brightness imaging region.

FIG. 5 is a block diagram functionally illustrating the configuration when the ECU 26 operates to conduct brightness reduction.

As can be seen, when the operations of the ECU 26 are viewed by that function, the ECU comprises a stereo processor 26a, a histogram generator 26b, an exposure parameter setting unit 26c, an image processor 26d and a behavior generator 26e.

The stereo processor 26a inputs the outputs of the two cameras (imaging devices) 82 mounted on the mobile object (robot) 10 and adapted to take images utilizing incident light from the external world in which an object (of imaging), specifically a human being, is present. Upon inputting the outputs, it performs stereo processing to calculate distance information for each pixel from the parallax of the inputted images. The number of pixels of the cameras 82 is 320×240. The stereo processor 26a calculates and outputs three-dimensional (3D) data from gray-scale image data.

The histogram generator 26b creates brightness histograms of the taken images and weights them by distance or in accordance with distance.

The exposure parameter setting unit 26c defines an exposure parameter (specifically, shutter speed) based on the brightness at the distance desired to be imaged. Owing to the fact that the cameras 82 are installed in the robot 10 to function as a visual sensor, the cameras 82 do not themselves seek out objects (of imaging) but are required to extract objects (of imaging) from taken images. So the lenses of the cameras 82 are fixed at the smallest aperture (the iris is set to the minimum) and are adjusted to be in focus at a near distance, specifically between about 0.5 m and 2.5 m. Therefore, only the shutter speed is adjustable as an exposure parameter.

The image processor 26d is responsive to movement of the robot 10 for performing image processing as a visual sensor.

The behavior generator 26e generates a predetermined behavior of the robot 10 for reducing a high-brightness imaging region, if present, imaged therein due to high-brightness incident light such as a light source.

The operation of the ECU 26 will now be explained in detail.

Figure 6:
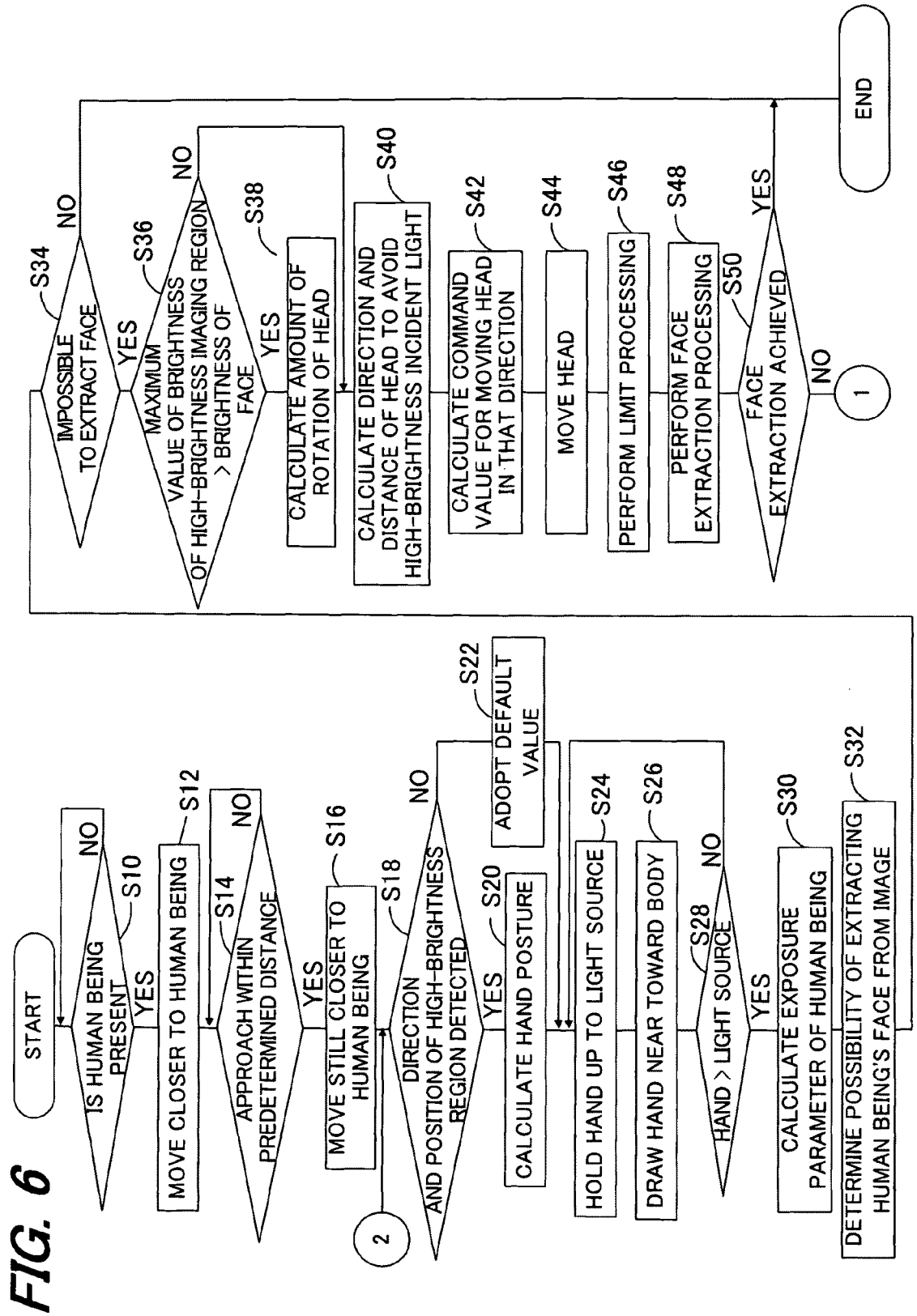
FIG. 6 is the former half of a flowchart showing the processing when the ECU shown in FIG. 4 conducts brightness reduction of high-brightness imaging region, similarly to FIG. 5.

FIG. 6 is the former half of a flowchart that, like FIG. 5, shows the processing performed by the ECU 26 for brightness reduction. The latter half of the flowchart is shown in FIG. 7.

In S10, it is determined whether a human being (object of imaging) is present. The presence/absence of a human being is determined from the output of the IC tag signal receiver 94, which receives identifying information transmitted by the IC tag 92 carried (worn) by the human being.

When the result in S10 is NO, the aforesaid processing is repeated and, when it is YES, the program goes to S12, in which the robot 10 moves closer to the human being, to S14, in which it approaches to within a predetermined distance of the human being, and to S16, in which it moves still closer to the human being.

Next, in S18, it is checked whether the direction and position (location) of a high-brightness imaging region in the image has been detected (i.e., it is determined whether a high-brightness imaging region is present in the image taken by the imaging device (CCD cameras 82)). When the result is YES, the program goes to S20, in which the optimum posture of the hand 22 is calculated, and when it is NO, the program goes to S22, in which a default value (initial value) of the hand 22 is adopted.

Next, in S24, the hand 22 is driven to hold it up to the light source, e.g., the sun, more exactly up to the high-brightness imaging region in the image. In other words, the hand 22 is driven to block bright incident light from a light source or the like.

Next, in S26, the hand 22 is drawn nearer (toward the body 14), whereafter the program goes to S28, in which it is checked whether the hand 22 has become larger than the light source, more exactly whether the high-brightness imaging region, in other words whether the high-brightness incident light has been blocked. When the result is NO, the program returns to S24 to repeat the aforesaid procedure.

FIG. 8 is a diagram for explaining the aforesaid operation of the hand 22 for reducing the brightness of the high-brightness imaging region.

As illustrated, the robot 10 moves the hand 22R to block or intercept the high-brightness incident light (optical axis) from the light source. The robot 10 brings the hand 22R nearer to the camera 82 mounted on its head 16 by moving it progressively through the positions A and B to position C. As a result, the blocked area of the incident light from the light source increases but the probability of the imaging region for the person being blocked also increases.

In the processing of S18 to S28, therefore, the hand 22 is driven to a position where the high-brightness incident light from the light source is totally blocked, i.e., to position as close to A as possible, while holding or maintaining the imaging region for the human being, in other words, while holding or maintaining the imaging parameters for the human being.

The explanation of FIG. 6 will be continued.

Next, in S30, the exposure parameter of the human being, i.e., the shutter speed, is calculated, whereafter, in S32, the possibility of extracting the human being's face from the image is determined.

Next, in S34, it is checked whether it is impossible to extract the face. When the result is YES, the program goes to S36, in which it is checked whether the high-brightness incident light from the light source or the like has caused the maximum value of the imaged brightness of the high-brightness imaging region to exceed the brightness of the face. When the result is YES, the program goes to S38, in which the amount of rotation of the head 16 is calculated.

Next, in S40, the direction and distance the head 16 needs to be moved to avoid the high-brightness incident light from the light source or the like is calculated, whereafter, in S42, a command value for moving the head 16 in that direction is calculated. The program then goes to S44, in which the head 16 is moved (rotated) accordingly, and to S46, in which limit processing is performed.

Thus, when it is found that the driving of the hand 22 in S18 to S28 does not enable the brightness of the high-brightness imaging region to be thoroughly reduced, the head 16 is rotated to avoid the high-brightness incident light.

The program then goes to S48, in which face extraction processing is performed, and to S50, in which it is checked whether the extraction of the face was achieved. When the result in S50 is NO, the program goes to S52 (FIG. 7), in which it is checked whether the average value of the brightness of the high-brightness imaging region exceeds the brightness of the extracted face. When the result in S52 is YES, the program goes to S54, in which an amount of gait (turning etc.) correction is calculated. When the result in S52 is NO, S54 is skipped.

Next, in S56, a gait command value is determined based on the calculated correction amount and is outputted, whereafter, in S58, the legs 12 are driven to implement walking control. The program then returns to S18 to repeat the aforesaid processing. In the aforesaid processing, the result in S34 being NO or the result in S50 being YES means that face extraction was achieved, so the remaining processing steps are skipped.

As set out in the foregoing, the first embodiment is configured to have a legged mobile robot (10) having an imaging device (CCD camera 82) for taking an image utilizing incident light from external world in which a human being to be imaged is present, comprising: brightness reduction operation execution means (the ECU 26, stereo processor 26a, histogram generator 26b, exposure parameter setting unit 26c, image processor 26d, behavior generator 26e, S10 to S58) for determining whether a high-brightness imaging region is present in the image taken by the imaging device and for executing brightness reduction operation to reduce brightness of the high-brightness imaging region produced by high-brightness incident light, when the high-brightness imaging region is present in the image. Owing to this configuration, when the imaged high-brightness imaging region is present owing to high-brightness incident light from the sun or the like, the legged mobile robot 10 can reduce the brightness to image a human being or other object with suitable brightness.

The legged mobile robot (10) is configured to comprise at least a body (14), arms (20) connected to the body and hands (22) connected to the arms (20) and the brightness reduction operation execution means drives at least one of the hands (22) to block the high-brightness incident light, thereby reducing the brightness of the high-brightness imaging region (S18 to S28). With this, the legged mobile robot 10 having the aforesaid effects further enables a human being or other object to be imaged with suitable brightness without enhancing the performance of the imaging device or the image processing.

In the legged mobile robot 10, the object (of imaging) is a human being and the brightness reduction operation execution means drives at least one of the hands (22) to block high-brightness incident light while holding the imaging region of the human being, i.e., imaging parameters of the human being (S18 to S28). With this, the legged mobile robot (10) having the aforesaid effects further enables reliable imaging of a human being who is the object (of imaging).

The legged mobile robot (10) is further configured to comprise at least a body (14) and a head (16), which is connected to the body (14) and equipped with the imaging device, and the brightness reduction operation execution means rotates the head (16) so as reduce the brightness of the high-brightness imaging region (S36 to S46). In this aspect also, therefore, the legged mobile robot 10 enables a human being or other object to be imaged with suitable brightness without enhancing the performance of the imaging device or the image processing, and further enables reliable imaging of an object even when the high-brightness imaging region is relatively large.

The legged mobile robot (10) is further configured to comprise at least a body (14) and a head (16), legs (12) and arms (20) connected to the body (14), and the brightness reduction operation execution means drives the legs (12) so as to reduce the brightness of the high-brightness imaging region (S54 to S58). In this aspect also, therefore, the legged mobile robot 10 enables a human being or other object to be imaged with suitable brightness without enhancing the performance of the imaging device or the image processing, and further enables still more reliable imaging of an object even when the high-brightness imaging region is relatively large.

Figure 9:
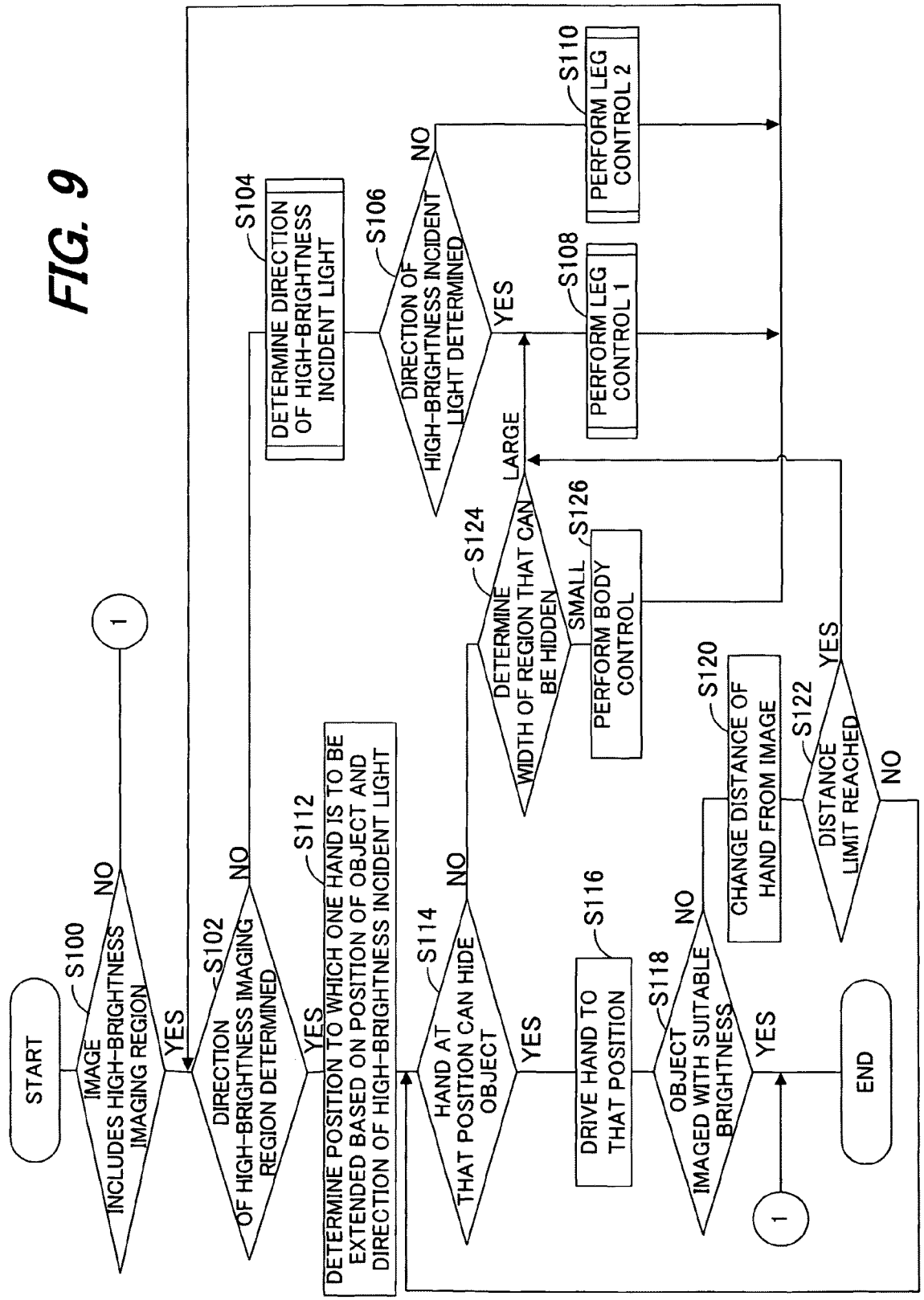
FIG. 9 is a flowchart that, similar to FIG. 6, but shows the operation of the legged mobile robot according to a second embodiment of this invention.

FIG. 9 is a flowchart that, similar to FIG. 6, but shows the operation of the legged mobile robot according to a second embodiment of this invention.

Explaining this, in S100, it is checked whether the image taken utilizing incident light from the external world (ambience) in which the object to be imaged (human being) is present includes (or has not been removed of) the high-brightness imaging region produced by the high-brightness incident light.

When the result in S100 is NO, the remaining process steps are skipped. When it is YES, the program goes to S102, in which it is checked whether the direction of the high-brightness imaging region has been determined or identified, in other words, whether the direction of the high-brightness incident light has been determined. When the result in S102 is NO, the program goes to S104, in which an incidence direction determining operation for determining the direction of the high-brightness incident light is performed.

Figure 10:
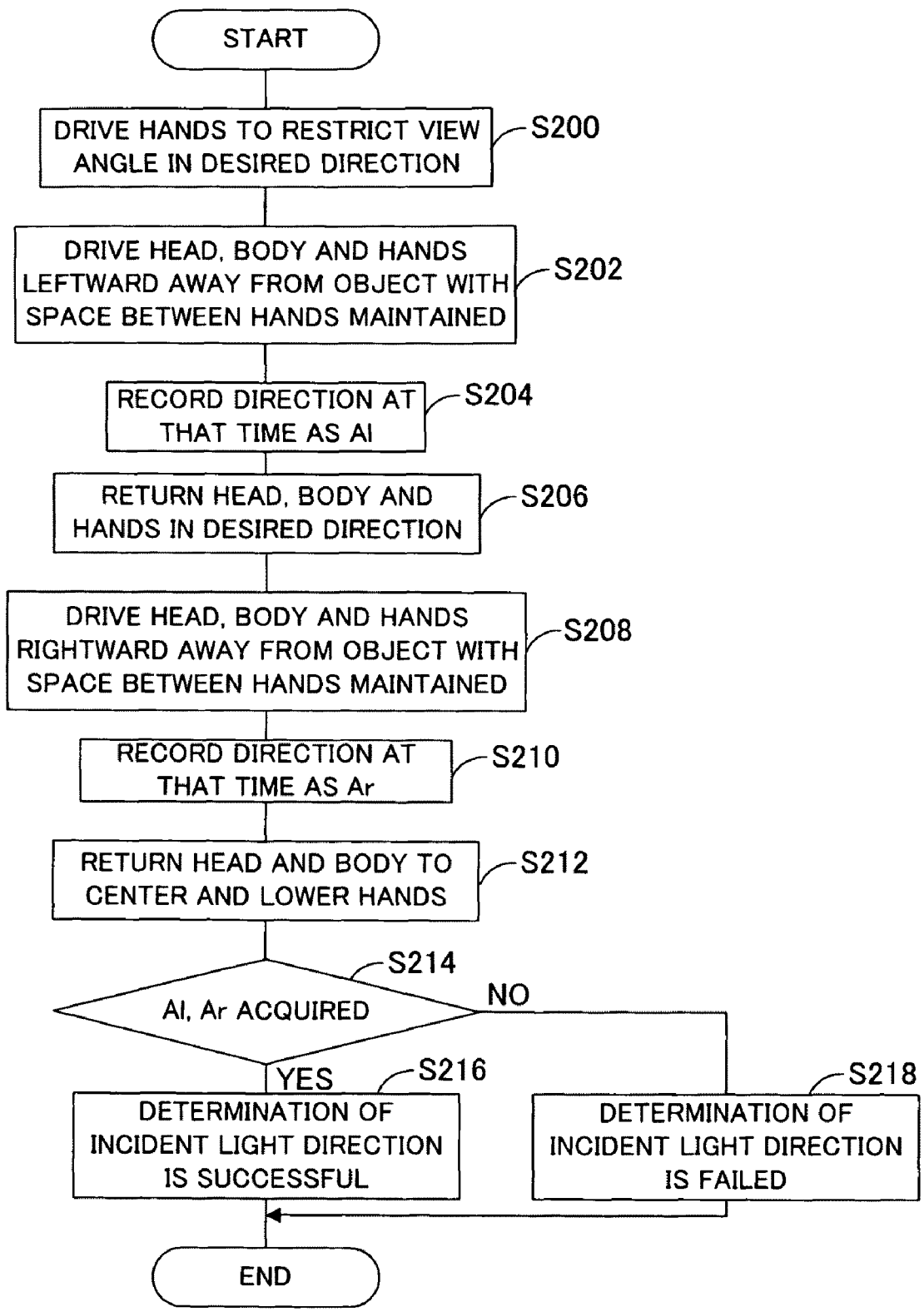
FIG. 10 is a subroutine flowchart showing an incidence direction determining operation for determining a direction of high-brightness incident light shown in FIG. 9.

FIG. 10 is a flowchart showing this operation. FIG. 11 is a set of views for explaining the operation of FIG. 10. In the following, explanation will be made in accordance with FIG. 10, with occasional reference to FIG. 11.

Figure 11A:
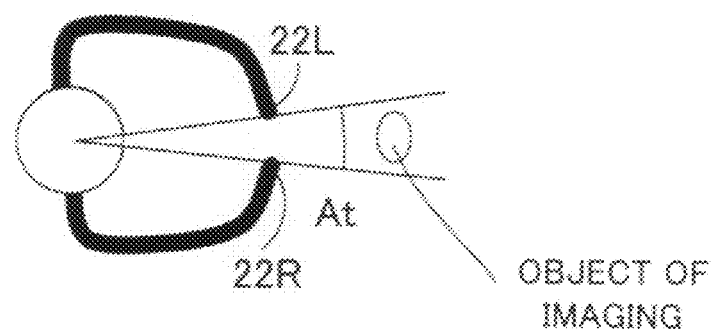
FIG. 11 is a set of views for explaining the operation of FIG. 10.

In S200, the hands 22 are driven to restrict the view angle in a desired direction. Specifically, as shown in FIG. 11A, since the direction of the incident light is unknown, the direction in which the object (of imaging) is present is made a target toward which both the left and right hands 22R, 22L are driven. At this time, a space is left between the hands 22R, 22L and the driving is performed so as not to block the incident light from the object (of imaging).

Figure 11B:
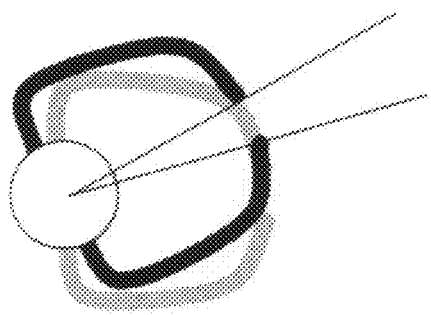
Figure 11C:
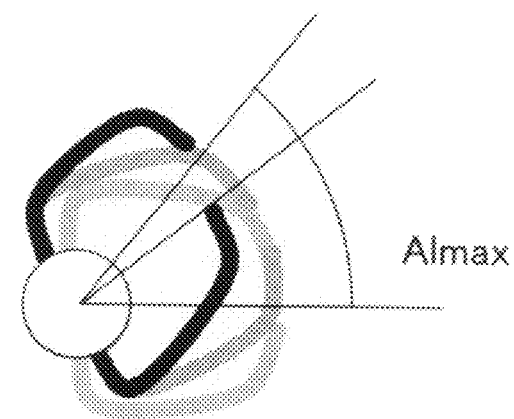

Next, in S202, as shown in FIG. 11B and FIG. 11C, the head 16, body 14 and hands 22 are driven leftward away from the object (of imaging) with the space between the hands 22R, 22L maintained, until the high-brightness imaging region is eliminated from the image. In this operation, once the motion of the body 14 and legs 12 reach their permissible limits, the head 16 and hands 22 are driven further leftward to the maximum value of leftward movability Almax.

When the high-brightness imaging region has been eliminated from the image, the program goes to S204, in which the direction at that time, i.e., the high-brightness incident light direction, is recorded as Al.

Next, in S206, the head 16, body 14 and hands 22 are returned in the desired direction, i.e., they are driven to the posture mentioned regarding S200.

Next, in S208, a reverse operation is performed in which the head 16, body 14 and hands 22 are driven rightward away from the object (of imaging) with the space between the hands 22R, 22L maintained, until the high-brightness imaging region is eliminated from the image. When the high-brightness imaging region has been eliminated from the image, the program goes to S210, in which the direction at that time, i.e., the high-brightness incident light direction, is recorded as Ar. The incident light directions designate angles in the plane of FIG. 11.

Next, in S212, driving is performed to return the head 16 and body 14 to the center (front) and lower the hands 22.

Next, in S214, it is checked whether Al and Ar were acquired (whether the direction of the high-brightness incident light was determined). When it is found that Al and Ar were acquired, the program goes to S216, in which the two values are divided by 2 and determination of the incident light direction is deemed successful. When one of them was not acquired, the program goes to S218, in which determination is deemed to have failed.

Explanation of the flowchart of FIG. 9 will be continued.

Next, in S106, it is checked whether the incident light direction was determined by the processing of FIG. 10. When the result is YES, the program goes to S108, in which leg control 1 is performed.

Figure 12:
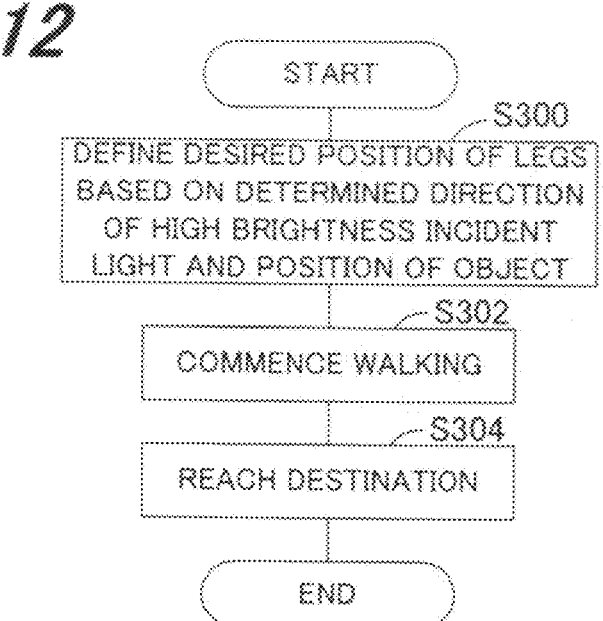
FIG. 12 is a subroutine flowchart showing leg control 1 of FIG. 9.

FIG. 12 is a flowchart showing this operation. FIG. 13 is a set of diagrams for explaining the operation of FIG. 12. In the following, explanation will be made in accordance with FIG. 12, with occasional reference to FIG. 13.

In S300, the desired position of each leg 12 is defined based on the determined direction of the high-brightness incident light (the direction of the high-brightness imaging region) and the position of the object (of imaging). Next, in S302, the legs 12 and other members are driven to commence walking and reach the destination in S304, whereupon the operation is terminated.

Figure 13A:
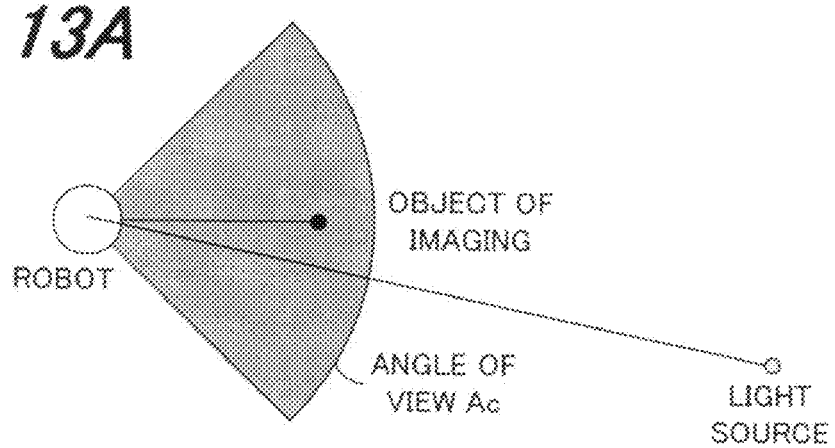
FIG. 13 is a set of views for explaining the operation of FIG. 12.
Figure 13B:
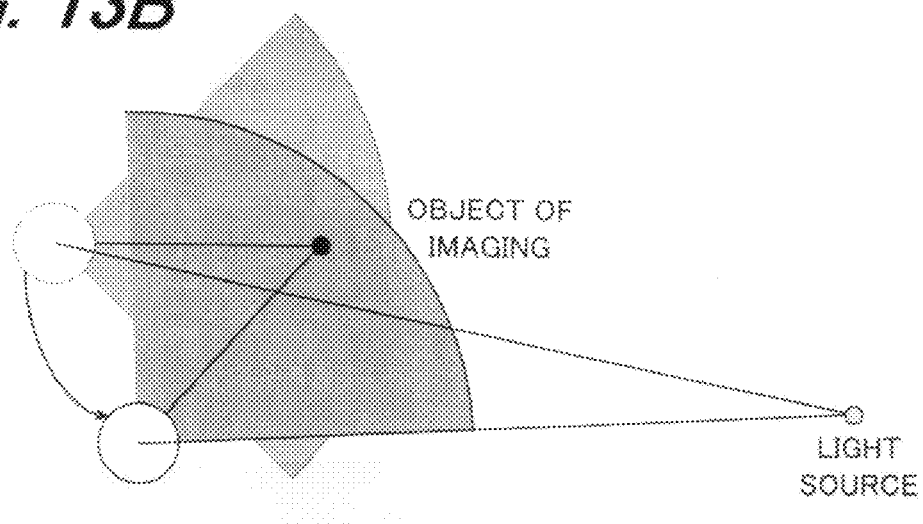

Specifically, when the light source (high brightness) is within the angle of view as shown in FIG. 13A, the legs 12 are, as shown in FIG. 13B, driven to move one step right while turning left, so as to avoid the incident light (make the incident light fall outside the angle of view).

Explanation of the flowchart of FIG. 9 will be resumed.

After the processing in S108, the program returns to S102, and when the result in S106 is NO (it is found that the incident light direction was not determined), the program goes to S110, in which leg control 2 is performed.

Figure 14:
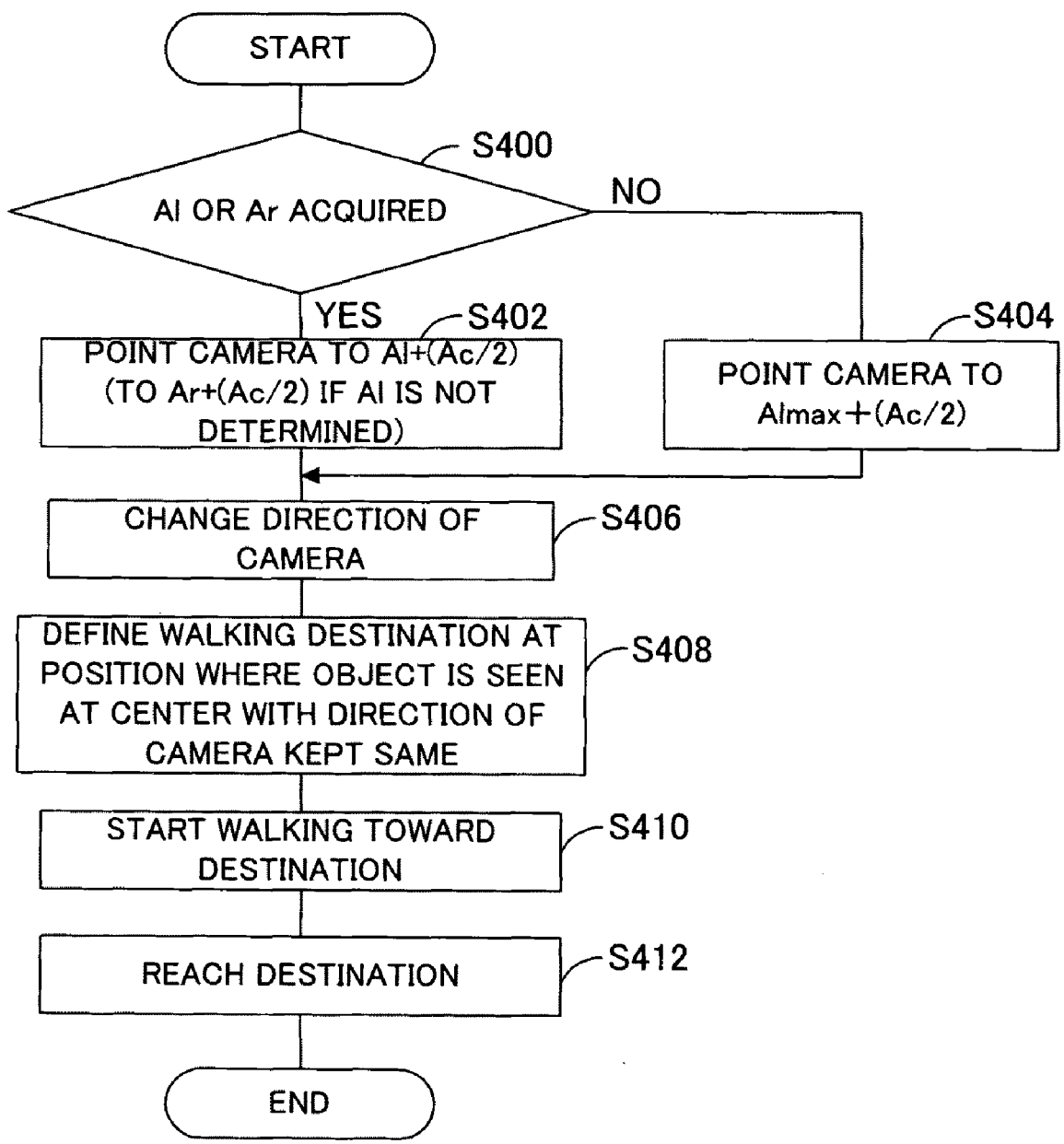
FIG. 14 is a subroutine flowchart showing leg control 2 of FIG. 9.

FIG. 14 is a flowchart showing this operation. FIG. 15 is a set of views for explaining the operation of FIG. 14. Explanation will be made in accordance with FIG. 14, with occasional reference to FIG. 15.

Figure 15A:
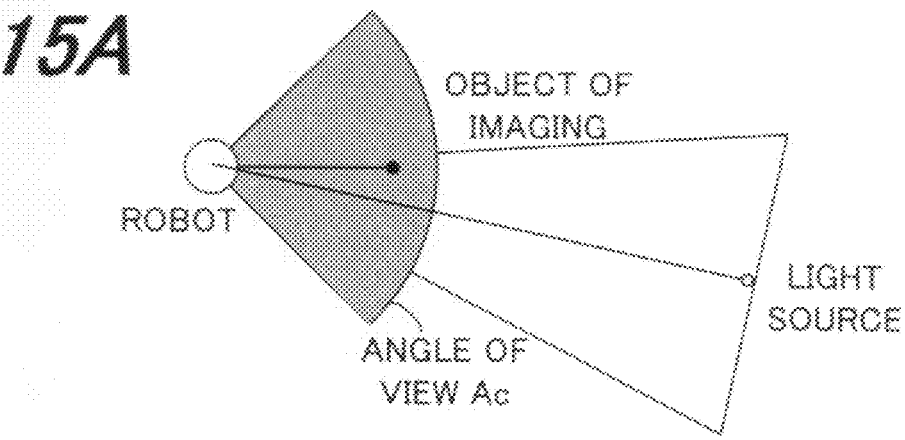
FIG. 15 is a set of views for explaining the operation of FIG. 14.

In S400, it is checked whether the high-brightness incident light direction Al or Ar was acquired. When the result is YES, the program goes to S402, in which the camera 82 is pointed to Al+(Ac/2) or, if Al is not determined, the camera 82 is pointed to Ar+(Ac/2). As shown in FIG. 15A, Ac indicates the angle of view. Thus, the aforesaid processing is intended to keep the high-brightness incident light from entering the angle of view.

When the result in S400 is NO, the program goes to S404, in which the camera 82 is pointed to Almax+(Ac/2) or Armax+(Ac/2). Armax is the maximum value of rightward movability. This processing is also intended to keep the high-brightness incident light from entering the angle of view.

Next, in S406, the direction of the camera 82 is changed or shifted. Specifically, when the camera 82 was pointed left (right) in S402 or S404, its direction is shifted right (left) in S406.

Figure 15B:
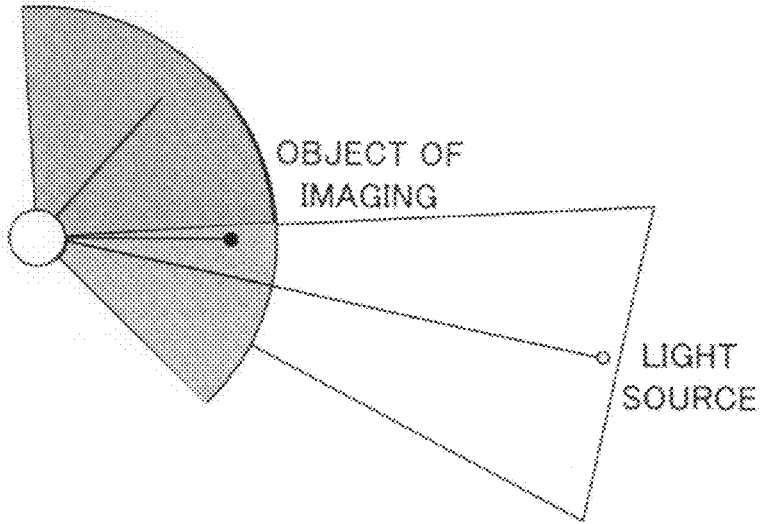
Figure 15C:
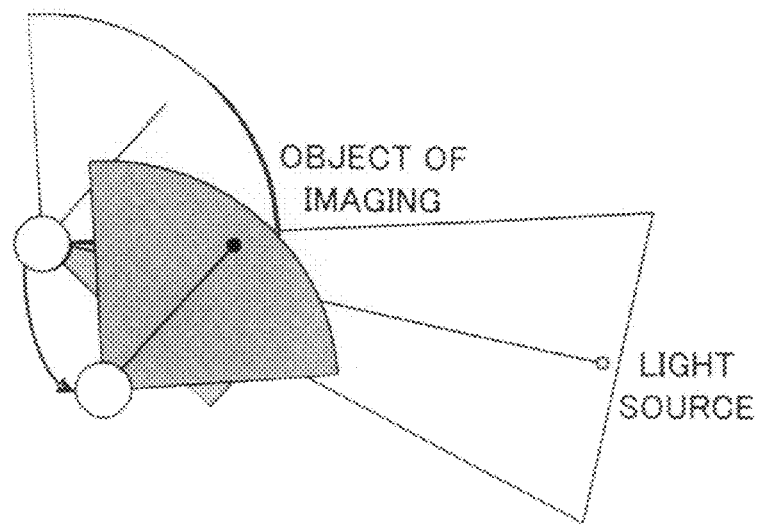
Figure 16:
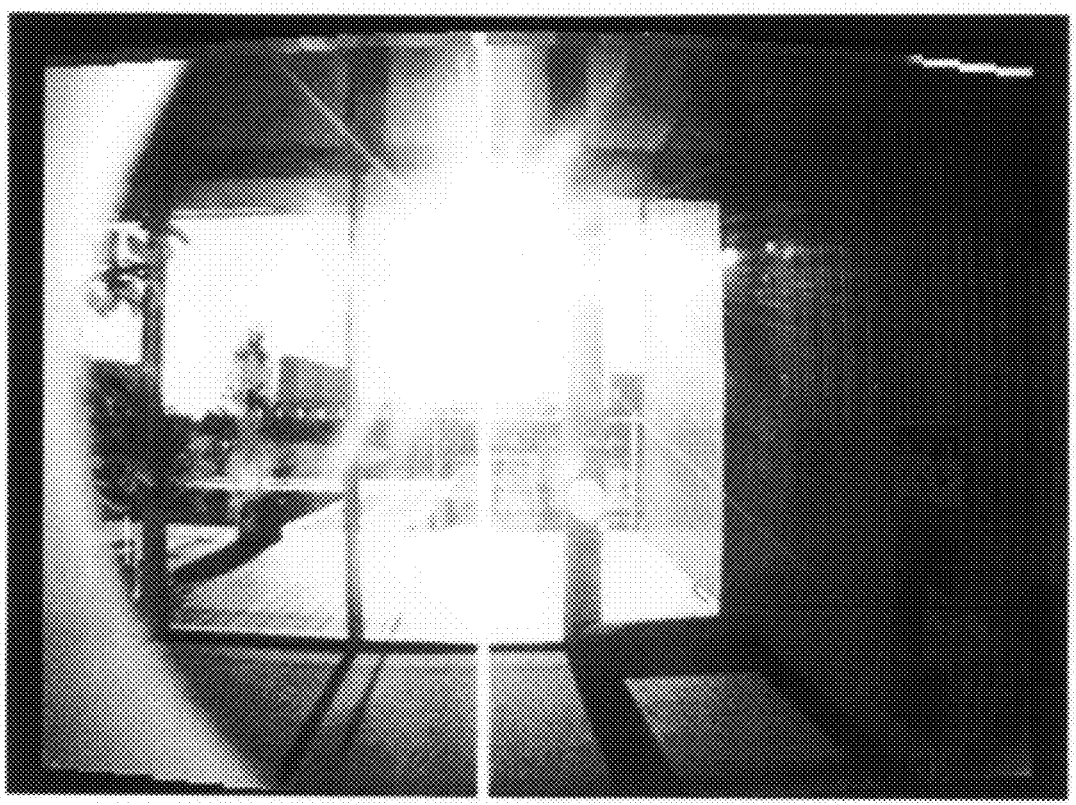
FIG. 16 is a view showing an example of a sight that is planned to be imaged by a camera (imaging device) according to the embodiments.

As shown in FIG. 15A to FIG. 15C, the aforesaid processing is repeated until the high-brightness imaging region has been removed. Once removal has been achieved, the program goes to S408, in which the walking destination is defined at a position where the object (of imaging) is seen at the center (front) with the direction of the camera 82 kept the same, to S410, in which walking toward the destination is started, and S412, in which the walking is stopped when it is determined that the destination has been reached.

The explanation of the flowchart of FIG. 9 will be continued.

Following the processing in S110, the program returns to S102. When the result in S102 is YES, the program goes to S112, in which the position to which one of the hands 22 is to be extended is determined based on the position of the object (of imaging) and the direction of the high-brightness incident light, to S114, in which it is checked whether the hand 22 at that position can hide the object (of imaging), and when the result is YES, to S116, in which the hand 22 is driven in the manner of S24 to S26 in the first embodiment.

In S116, therefore, the hand 22 can be driven to a position where the high-brightness incident light from the light source is totally blocked without blocking the incident light from the object (of imaging), namely, to a position as near A as possible.

Next, in S118, it is checked whether the object (of imaging) is imaged with suitable brightness. If the result is YES, the processing is terminated. If it is NO, the program goes to S120, in which, as shown in FIG. 8, the distance of the hand 22 from the image (in other words, from the head 16) is changed and the aforesaid processing is repeated until it is found that the distance limit (C in FIG. 8) has been reached. When it is found in S122 that the distance limit has been reached, the program goes to S108.

When the result in S114 is NO, the program goes to S124, in which the width of the high-brightness imaging region that can be hidden is determined. When it is found to be large, the program goes to S108. When it is small, the program goes to S126, in which body control is performed. This is control for driving the head 16 to move (avoid) the high-brightness incident light. The program then goes to S102 to repeat the aforesaid processing.

The second embodiment is thus configured to have a legged mobile robot (10) having an imaging device (CCD camera 82) for taking an image utilizing incident light from external world in which a human being to be imaged is present, comprising: brightness reduction operation execution means (the ECU 26, stereo processor 26a, histogram generator 26b, exposure parameter setting unit 26c, image processor 26d, behavior generator 26e, S10 to S58) for determining whether a high-brightness imaging region is present in the image taken by the imaging device and for executing brightness reduction operation to reduce brightness of the high-brightness imaging region produced by high-brightness incident light, when the high-brightness imaging region is present in the image; and high-brightness incidence direction determination operation execution means (the ECU 26, stereo processor 26a, histogram generator 26b, exposure parameter setting unit 26c, image processor 26d, behavior generator 26e, S100 to S104, S200 to S218) for executing incidence direction determining operation for determining direction of the high-brightness incident light of the high-brightness imaging region. With this, when a bright light source such as the sun is visible to the mounted camera (imaging device) 82, the incidence direction of the high brightness can be determined, so that it can be avoided while correcting the camera parameters to image the object (of imaging) with suitable brightness.

The legged mobile robot (10) is configured to comprise at least a body (14), arms (20) connected to the body (14), and hands (22) connected to the arms (20), and the high-brightness incidence direction determination operation execution means determines the direction of the high-brightness incident light by driving at least the hands (S104, S200 to S218, S106). With this, the robot 10 having the aforesaid effects can further readily determine the incidence direction of the high brightness.

The robot 10 further comprises the brightness reduction operation execution means for executing the brightness reduction operation for reducing the brightness of the high-brightness imaging region (S108, S110, S300 to S304, S400 to S412, S116 to S126). With this, the robot 10 having the aforesaid effects is further responsive to the presence of an imaged high-brightness imaging region caused by high-brightness incident light from the sun or the like for reducing the brightness to enable a human being or other object to be imaged with suitable brightness.

The legged mobile robot (10) comprises at least a body (14), arms (20) connected to the body (14), and hands (22) connected to the arms (20), and the brightness reduction operation execution means drives at least one of the hands 22 to block the high-brightness incident light, thereby reducing the brightness of the high-brightness imaging region (S116 to S122). Therefore, the robot 10 having the aforesaid effects further enables a human being or other object to be imaged with suitable brightness without enhancing the performance of the imaging device or the image processing.

The robot (10) is further configured to comprise at least a body (14) and a head (16) connected to the body (14) and equipped with the imaging device, and the brightness reduction operation execution means to rotate the head (16) so as to avoid the high-brightness incident light (S126). In this aspect also, therefore, the legged mobile robot 10 enables a human being or other object to be imaged with suitable brightness without enhancing the performance of the imaging device or the image processing, and further enables reliable imaging of an object even when the high-brightness imaging region is relatively large.

The legged mobile robot (10) is further configured to comprise at least a body (14) and a head (16), legs (12) and arms (20) connected to the body (14), and the brightness reduction operation execution means drives the legs (12) so as to avoid the high-brightness incident light (S108, S300 to S304, S110, S400 to S412). In this aspect also, therefore, the legged mobile robot 10 enables a human being or other object to be imaged with suitable brightness without enhancing the performance of the imaging device or the image processing, and further enables still more reliable imaging of an object even when the high-brightness imaging region is relatively large.

In the foregoing explanation, the object (of imaging) was presumed to be a human being but it can instead be some other object, such as a tool or workpiece, associated with the task performed by the robot 10.

In the aforesaid configurations, the presence/absence of an object (of imaging) is determined from the output of the IC tag signal receiver 94, which receives identifying information transmitted by the IC tag 92 carried (worn) by the object (of imaging). However, the determination can instead be made from the output of the camera 82. Alternatively, the robot 10 can be informed of the presence/absence of an object (of imaging) by inputting a command from the outside.

In the foregoing explanation, a legged mobile robot, specifically a biped walking robot, was taken as an example of the mobile object. However, this is not a limitation and the mobile object can be of any kind capable of moving autonomously.

Japanese Patent Application Nos. 2007-224755 and 2007-224756 both filed on Aug. 30, 2007, are incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A legged mobile robot having a body, arms and legs connected to the body, hands connected to the arms, an imaging device for taking an image utilizing incident light from external world in which a human being to be imaged is present, and a head connected to the body and equipped with the imaging device, the legged mobile robot comprising:

an electronic control unit including a high-brightness imaging region determiner configured to determine whether a high-brightness imaging region is present in the image taken by the imaging device and a brightness reduction operation executer configured to block or avoid high-brightness incident light by driving at least one of the hands, head and legs, thereby executing a brightness reduction operation to reduce brightness of the high-brightness imaging region produced by the high-brightness incident light when the high-brightness imaging region is present in the image, wherein the electronic control unit further includes an incidence direction determiner that is configured to determine whether a direction of the high-brightness incident light has been identified and an incidence direction determining operation executer that is configured to execute an incidence direction determining operation to determine the direction of the high-brightness incident light when the direction of the high-brightness incident light has not been identified, and the brightness reduction operation executer drives one of the hands to block the high-brightness incident light and bring the driven hand nearer toward the head until the hand in the image taken by the imaging device becomes larger than the high-brightness imaging region while holding imaging parameters of the human being, thereby reducing the brightness of the high-brightness imaging region when the direction of the high-brightness incident light has been identified, and rotates the head to make the high-brightness incident light fall outside an angle of view and drive the legs to a position where the human being is seen at a center while holding an angle of the rotated head when the direction of the high-brightness incident light is not determined by the incidence direction determining operation executer, thereby reducing the brightness of the high-brightness imaging region.

2. The legged mobile robot according to claim 1, wherein the brightness reduction operation executer is configured to rotate the head so as to reduce the brightness of the high-brightness imaging region when the direction of the high-brightness incident light has been identified and the driven hand hides the human being.

3. The legged mobile robot according to claim 1, wherein the brightness reduction operation executer is configured to drive the legs so as to reduce the brightness of the high-brightness imaging region when the direction of the high-brightness incident light is determined by the incidence direction determining operation executer.

4. The legged mobile robot according to claim 3, wherein the brightness reduction operation executer is configured to drive the legs to make the high-brightness incident light fall outside an angle of view when the direction of the high-brightness incident light is determined, thereby reducing the brightness of the high-brightness imaging region.

5. The legged mobile robot according to claim 1, wherein the incidence direction determining operation executer is configured to determine the direction of the high-brightness incident light by driving at least the hands.

6. The legged mobile robot according to claim 1, wherein the brightness reduction operation executer is configured to rotate the head so as to reduce the brightness of the high-brightness imaging region when a maximum value of the brightness of the high-brightness imaging region exceeds the brightness of the human being.

7. The legged mobile robot according to claim 1, wherein the brightness reduction operation executer is configured to drive the legs so as to reduce the brightness of the high-brightness imaging region when an average value of the brightness of the high-brightness imaging region exceeds the brightness of the human being.

8. The legged mobile robot according to claim 1, wherein the incidence direction determining operation executer is configured to determine the direction of the high-brightness incident light by driving the both hands toward a direction in which the human being is present in the image and driving the head, body and hands leftward and rightward away from the human being until the high-brightness imaging region is eliminated from the image.

9. A method of controlling a legged mobile robot having a body, arms and legs connected to the body, hands connected to the arms, and an imaging device for taking an image utilizing incident light from external world in which a human being to be imaged is present, and a head connected to the body and equipped with the imaging device, the method comprising:

determining whether a high-brightness imaging region is present in the image taken by the imaging device;

driving at least one of the hands, head and legs to block or avoid high-brightness incident light, thereby executing brightness reduction operation to reduce brightness of the high-brightness imaging region produced by the high-brightness incident light, when the high-brightness imaging region is present in the image, direction determining whether a direction of the high-brightness incident light has been identified; and executing an incidence direction determining operation to determine the direction of the high-brightness incident light when the direction of the high-brightness incident light has not been identified;

wherein the driving comprises driving one of the hands to block the high-brightness incident light and bringing the driven hand nearer toward the head until the hand in the image taken by the imaging device becomes larger than the high-brightness imaging region while holding imaging parameters of the human being, thereby reducing the brightness of the high-brightness imaging region when the direction of the high-brightness incident light has been identified, and wherein the driving comprises rotating the head to make the high-brightness incident light fall outside an angle of view and driving the legs to a position where the human being is seen at a center while holding an angle of the rotated head when the direction of the high-brightness incident light is not determined by the incidence direction determining operation, thereby reducing the brightness of the high-brightness imaging region.

10. The method according to claim 9, wherein the driving comprises rotating the head so as to reduce the brightness of the high-brightness imaging region when a maximum value of the brightness of the high-brightness imaging region exceeds the brightness of the human being.

11. The method according to claim 9, wherein the driving comprises driving the legs so as to reduce the brightness of the high-brightness imaging region when an average value of the brightness of the high-brightness imaging region exceeds the brightness of the human being.

12. The method according to claim 9, wherein the executing comprises determining the direction of the high-brightness incident light by driving the both hands toward a direction in which the object human being is present in the image and driving the head, body and hands leftward and rightward away from the human being until the high-brightness imaging region is eliminated from the image.

13. The method according to claim 9, wherein the driving comprises driving the legs to make the high-brightness incident light fall outside an angle of view when the direction of the high-brightness incident light is determined, thereby reducing the brightness of the high-brightness imaging region.

\* \* \* \* \*